United States Patent
Lection et al.

(10) Patent No.: US 9,983,845 B2
(45) Date of Patent: May 29, 2018

(54) UPDATING MEDIA FILES FOR INCREASED RESOLUTION WITH OPTIMIZED USAGE OF STORAGE

(71) Applicant: International Business Machines Corporation, Armonk, NY (US)

(72) Inventors: David B. Lection, Raleigh, NC (US); Mark B. Stevens, Austin, TX (US); John D. Wilson, League City, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 15/165,460

(22) Filed: May 26, 2016

(65) Prior Publication Data

US 2017/0344335 A1    Nov. 30, 2017

(51) Int. Cl.
*G06F 17/00* (2006.01)
*G06F 3/16* (2006.01)
*H04L 29/08* (2006.01)
*G05B 15/02* (2006.01)
*G06F 17/30* (2006.01)

(52) U.S. Cl.
CPC .............. *G06F 3/16* (2013.01); *G05B 15/02* (2013.01); *G06F 17/3074* (2013.01); *H04L 67/06* (2013.01)

(58) Field of Classification Search
CPC .......................... G06F 3/165; G06F 17/3074
See application file for complete search history.

(56) References Cited

U.S. PATENT DOCUMENTS

| 6,208,746 | B1 | 3/2001 | Musgrave |
| 7,868,238 | B2 | 1/2011 | Sugimoto et al. |
| 2006/0080109 | A1* | 4/2006 | Kakuno ................ G10L 19/167 704/500 |
| 2008/0155257 | A1 | 6/2008 | Werner et al. |
| 2009/0020613 | A1 | 1/2009 | Chang et al. |
| 2010/0205162 | A1 | 8/2010 | Davis |
| 2014/0289376 | A1 | 9/2014 | Chan et al. |

FOREIGN PATENT DOCUMENTS

WO    2005006647 A2    1/2005

* cited by examiner

*Primary Examiner* — Joseph Saunders, Jr.
(74) *Attorney, Agent, or Firm* — Scully, Scott, Murphy & Presser, P.C.; Kurt P. Goudy, Esq.

(57) ABSTRACT

A device of updating a media file for an increased resolution includes an I/O interface, a processor, and a storage device. The I/O interfaces acquires a first media file having first data samples and a second media file having second data samples. Each first data sample is sampled from an analog media signal and encoded with P bits and each second data sample is sampled from the analog media signal and encoded with Q bits, wherein "P" and "Q" are integers, and a resolution in bits of Q is greater than a resolution in bits of. The processor divides each second data sample by a corresponding one of the first data samples to calculate third data samples. The storage device stores the calculated third data samples as a third media file.

20 Claims, 8 Drawing Sheets

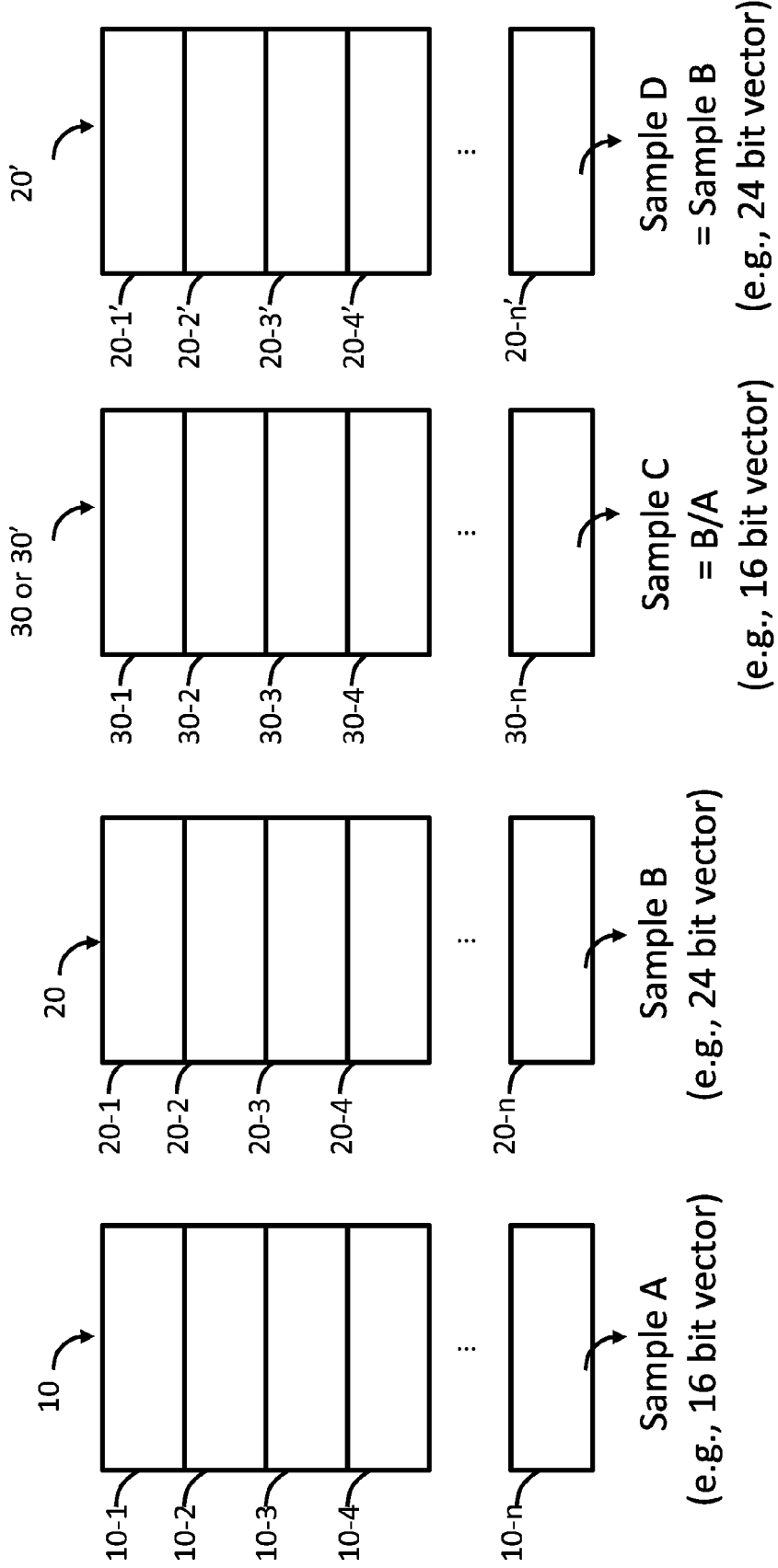

UPDATING MEDIA FILES FOR INCREASED RESOLUTION WITH OPTIMIZED USAGE OF STORAGE

FIELD

The present disclosure generally relates to a method of updating a media file for an increased resolution, and more particularly, to a method of upgrading an audio file with an increased resolution and a device for performing the same.

BACKGROUND

In today's world when a user purchases a media file (e.g., music) from service providers, the media file as delivered may have a 16 bits/sample encoding resolution and a 44.1 kHz sampling rate, similar or the same as a compact disk (CD). Hereinafter, the encoding resolution is referred to as a number of bits encoded used for each sampled media signal.

The idea of high resolution media is becoming popular because hobbyist and audiophiles are purchasing equipments to encode their original analog media on vinyl with a higher resolution. For a relatively high resolution media, a typical resolution used for encoding may be 24 bits/sample and the sampling rate Fs may be 44.1 kHz, 48 kHz, 96 kHz, or the like.

Such increase in resolution may add both additional visual or sound precision to the media, but also increase the dynamic range. With the additional bits in each sample, the dynamic range can be wider.

Thus, users may want to upgrade their media files for an increased resolution, optimizing storage resource usage. A normal upgrade may only add additional files to the storage device, replacing relatively low resolution files (e.g., 16 bits/sample resolution media file) with the relatively high resolution files (e.g., 24 bits/sample resolution media file).

If the users want to keep both the low and high resolution files, the storage space may be required to be as much the size of the respective low and high resolution files.

SUMMARY

In one aspect, there is provided a device of updating a media file for an increased resolution. The device includes an input/output (I/O) interface, a processor, and a storage device. The I/O interface receives a first media file having a plurality of first data samples and a second media file having a plurality of second data samples and transmits the first and second media files to a processor. Each of the first data samples is sampled from an analog media signal and encoded with P bits and each of the second data samples is sampled from the analog media signal and encoded with Q bits, wherein "P" and "Q" are integers, and a resolution in bits of Q is greater than a resolution in bits of P. The processor divides each of the second data samples by a corresponding one of the first data samples to calculate a plurality of third data. The storage device stores the calculated third data samples into a third media file of the storage device.

In another aspect, there is provided a method of updating a media file for an increased resolution. The method includes receiving, at a processing unit, a first media file having a plurality of first data samples and a second media file having a plurality of second data samples, dividing, at the processing unit, each of the second data samples by a corresponding one of the first data samples to obtain a plurality of third data samples, and storing, in a storage device, the plurality of third data samples into a third media file. Each of the first data samples is sampled from an analog media signal and encoded with P bits and each of the second data samples is sampled from the analog media signal and encoded with Q bits, wherein "P" and "Q" are integers, and a resolution in bits of Q is greater than a resolution in bits of P.

Further, in another aspect, there is provided a computer program product for performing updating a media file for an increased resolution. The computer program product is stored in a non-transitory computer-readable storage medium having computer readable program instructions. The computer readable program instructions are read and carried out by a processor. The method includes receiving a first media file having a plurality of first data samples and a second media file having a plurality of second data samples, dividing each of the second data samples by a corresponding one of the first data samples to obtain a plurality of third data samples, and storing the plurality of third data samples into a third media file of a storage device. Each of the first data samples is sampled from an analog media signal and encoded with P bits and each of the second data samples is sampled from the analog media signal and encoded with Q bits, wherein "P" and "Q" are integers, and a resolution in bits of Q is greater than a resolution in bits of P.

BRIEF DESCRIPTION OF THE DRAWINGS

FIGS. 2A to 2D illustrate examples of first, second, intermediate, and third media files, respectively, according to an embodiment of the present disclosure;

DETAILED DESCRIPTION OF THE EMBODIMENTS

Figure 1:
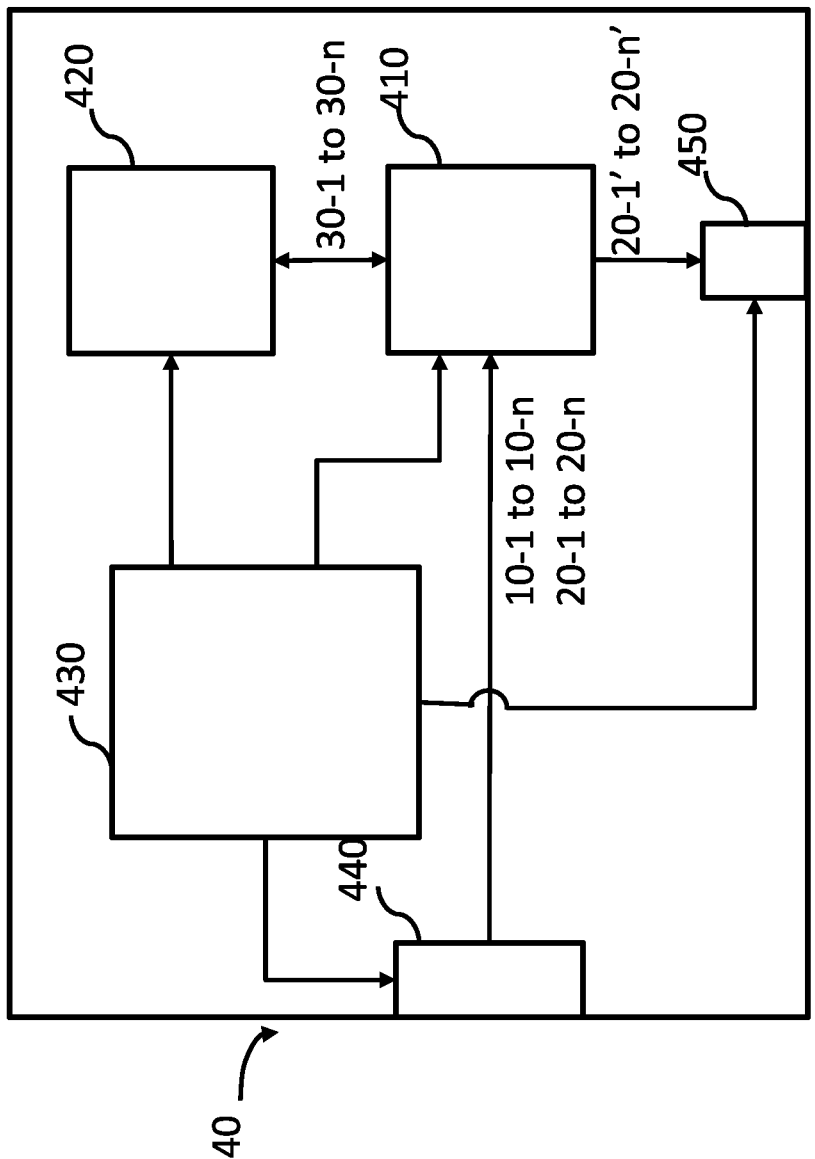
FIG. 1 is a block diagram of a device of updating a media file for an increased resolution according to an embodiment of the present disclosure.

Like reference numerals may refer to like elements throughout the written descriptions and drawings.

Figure 3B:
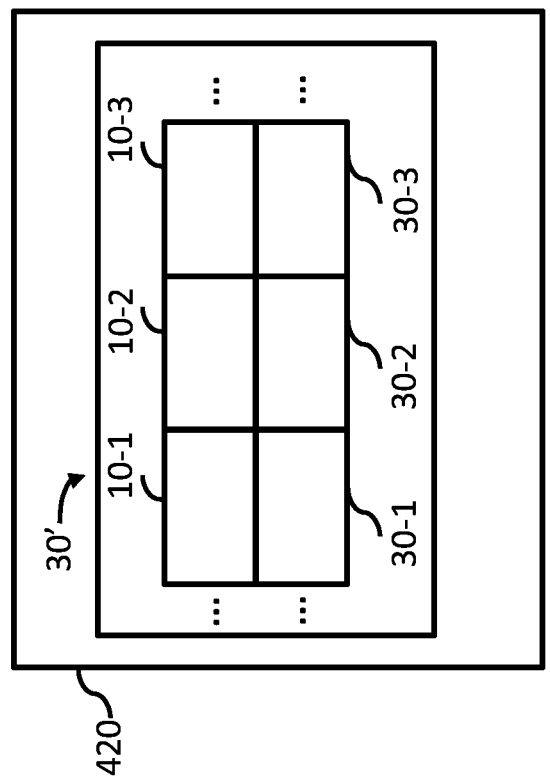
FIGS. 3A and 3B illustrate examples of media files stored in a storage of the device according to an embodiment of the present disclosure.
Figure 3A:
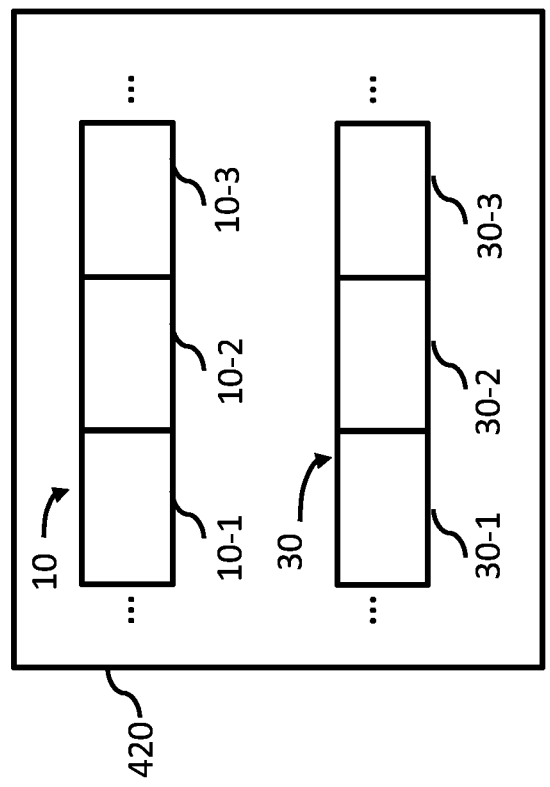

FIG. 1 is a block diagram of a device 40 of updating a media file for an increased resolution according to an embodiment of the present disclosure. FIGS. 2A to 2D illustrate examples of first, second, intermediate, third media files 10, 20, 30/30', and 20', respectively, according to an embodiment of the present disclosure. FIGS. 3A and 3B illustrate examples of media files stored in a storage 420 of the device 40 according to an embodiment of the present disclosure.

Referring to FIG. 1, the device 40 may include a media file encoder/decoder 410, a storage 420, a control system 430, an input interface 440, and an output interface 450. The media file encoder/decoder 410 may receive first and second media files 10 and 20 through the input interface 440 from an external device (not shown in FIG. 1). While it is illustrated in FIG. 1 that the input and output interface 430 and 440 are separated from each other, exemplary embodiments of the present disclosure are not limited thereto, and for example, the input and output interfaces 430 and 440 may be implemented into a single input/output (I/O) interface. The input and output interfaces 430 and 440 may allow the device 40 to communicate with external devices (e.g., a media distributing server 50 or a media player 60 of FIG. 6) to exchange media files. The input and output interfaces 430 and 440 may be implemented using, e.g., a communication modem (not shown) based on a radio connection or e.g., a universal serial bus (USB) based on a physical interface.

Each of the first and second media files 10 and 20 may include media contents such as music, songs, or the like. It is assumed throughout the present disclosure that the second media file 20 is encoded with a relatively high resolution (e.g., 24 bits/sample) than that (e.g., 16 bits/sample) of the first media file 10.

For example, the first media file 10 may be generated by encoding an analog media signal with a first encoding resolution and a first sampling frequency to include a plurality of first data vectors (e.g., a plurality of data samples) 10-1 to 10-n, as shown in FIG. 2A. The first media file 10 may be received by the device 40 through the input interface 440. The first encoding resolution may be, but not limited to, 16 bits/sample, 18 bits/sample, and 20 bits/sample, and the first sampling frequency may be, but not limited to, 44.1 kHz. Here, "n" is an integer of at least one.

In addition, the second media file 20 may be generated to upgrade sound quality of the first media file 10 by encoding the analog media signal with a second encoding resolution and a second sampling frequency to include a plurality of second data vectors (e.g., a plurality of data samples) 20-1 to 20-n, as shown in FIG. 2B. The second encoding resolution may be, but not limited to, 24 bits/sample, and the second sampling frequency may be, but not limited to, 44.1 kHz, or 96 kHz. In an embodiment, the first and second sampling frequencies may be the same as each other to ensure the same number of samples in each of the first media file 10 and the second media file 20.

Referring back to FIG. 1, the control device 430 may include a microprocessor or like controller to control operations of the media file encoder/decoder 410, the storage 420, the input interface 440, and the output interface 450.

For example, the control device 430 may control the media file encoder/decoder 410 to receive the first media file 10 and the second media file 20 and divide each of the second data vectors 20-1 to 20-n of the second media file 20 by a corresponding one of the first data vectors 10-1 to 10-n of the first media file 10 to obtain a plurality of intermediate data vectors (e.g., data samples) 30-1 to 30-n, as shown in FIG. 2C. Each of the intermediate data vectors 30-1 to 30-n may be calculated by dividing each of the second data vectors 20-1 to 20-n by a corresponding one of the first data vectors 10-1 to 10-n.

For example, referring to FIGS. 2A to 2C, each of the first data vectors 10-1 to 10-n may be a 16 bit vector, referred to as a "sample A", each of the second data vectors 20-1 to 20-n may be a 24 bit vector, referred to as a "sample B", and each of the intermediate data vectors 30-1 to 30-n, referred to as a "sample C", may be obtained by dividing the sample B by the sample A (e.g., C=B/A).

For example, if the first data vector 10-1 and the second data vector 20-1 have hexadecimal values of "2710H" and "98968H", respectively, the media file encoder/decoder 410 may output an intermediate data vector 30-1 having a hexadecimal value of "3E8H" as a result of dividing the hexadecimal value "98968H" by the hexadecimal value "2710H", and transmit the intermediate data vector 30-1 of "3E8H" to the storage 420 rather than sending the second data vector 20-1 of "98968H" to the storage 420.

Substantially the same operations as those given for the above-mentioned pair of data vectors 10-1 and 20-1 may repetitively be applied to other combinations of the data vectors (e.g., 10-2 and 20-2 to 10-n and 20-n) to end up obtain the plurality of intermediate data vectors 30-1 to 30-n.

In an embodiment, instead of the second data vectors 20-1 to 20-n being stored, the intermediate data vectors 30-1 to 30-n may be stored in the storage 420 to optimize usage of the storage device. Since each of the intermediate data vectors 30-1 to 30-n has a smaller memory size than each of the second data vectors 20-1 to 20-n, a storage usage may be reduced. However the present disclosure is not limited thereto. For example, only the intermediate data vectors 30-1 to 30-n may be stored, the first data vectors 10-1 and 10-n being erased. In an embodiment, both of the intermediate data vectors 30-1 to 30-n and the first data vectors 10-1 and 10-n may be stored in the storage 420, which allows a user to retain the first data vectors 10-1 and 10-n in a storage device (e.g., 420 of FIG. 1).

In an embodiment, referring to FIG. 3A, the first data vectors 10-1 to 10-n and the intermediate data vectors 30-1 to 30-n may be stored in separate files which are the first media file 10 and a first intermediate media file 30, respectively, so that the low quality media content (e.g., 10) may continue to be played back even while or after the original media file has been updated. Alternatively, the first data vectors 10-1 to 10-n and the intermediate data vectors 30-1 to 30-n may be stored in a same file which is a second intermediate media file 30'.

In an embodiment, the first media file 10, the first intermediate media file 30, and/or the second intermediate media file 30' may be compressed in a lossless manner to be stored in the storage 420, however it is assumed in the present disclosure that the first media file 10, the first intermediate media file 30, and/or the second intermediate media file 30' is/are not compressed to be stored in the storage 420. However, exemplary embodiments of the present disclosure are not limited thereto.

Referring back to FIG. 1, in order to retrieve the original media contents encoded with a relatively high resolution (e.g., 24 bits/sample), the control device 430 may control the media file encoder/decoder 410 to read the first data vectors 10-1 to 10-n and the intermediate media vectors 30-1 to 30-n from the first media file 10 and the first intermediate media file 30, or the second intermediate media file 30' and multiply each of the intermediate data vectors 30-1 to 30-n by a corresponding one of the first data vectors 10-1 to 10-n to obtain a plurality of third data vectors (e.g., data samples) 20-1' to 20-n'.

For example, each of the third data vectors 20-1' to 20-n', referred to as a "sample D", as shown in FIG. 2D, may be calculated by multiplying each of the intermediate data vectors 30-1 to 30-n by a corresponding one of the first data vectors 10-1 to 10-n.

Figure 6:
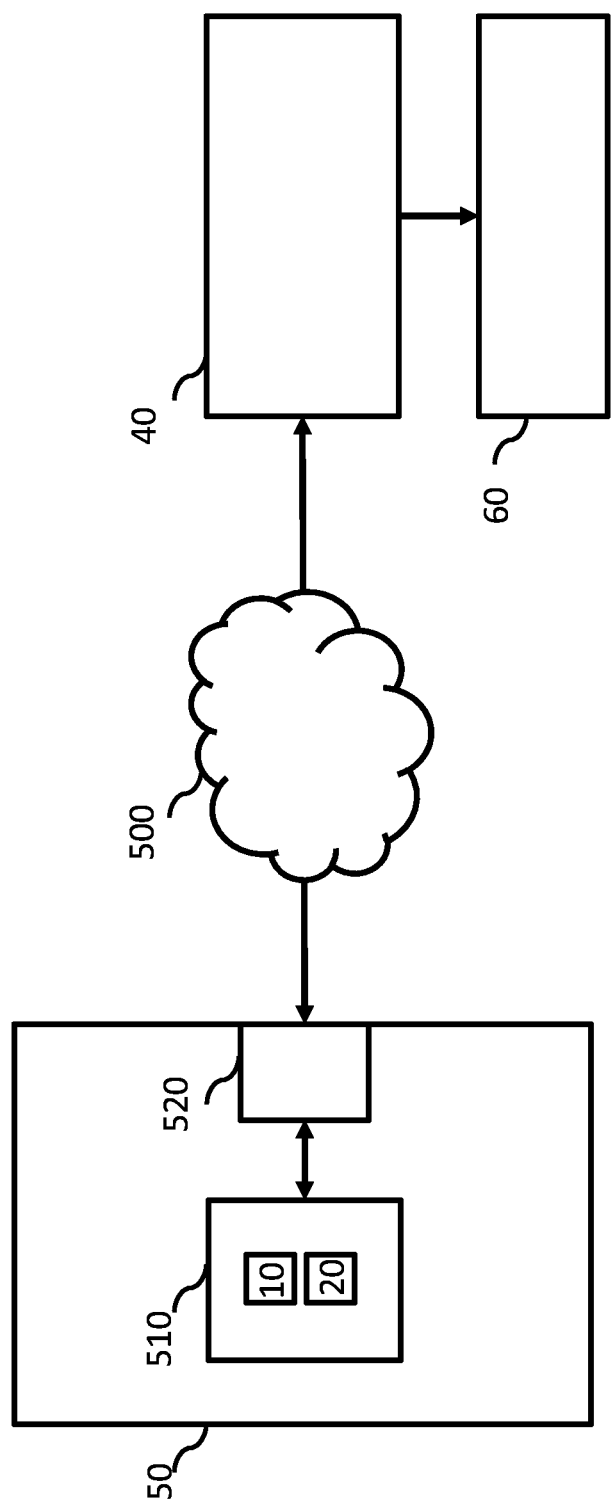
FIG. 6 is a diagram illustrating a media distributing system including a media distributing server and a user device according to an embodiment of the present disclosure.

The third data vectors 20-1' to 20-n' may constitute a third media file 20', as shown in FIG. 2D, and each may correspond to each of the second data vectors 20-1 to 20-n. The third data vectors 20-1 to 20-n' may be played back through a media player 60, as shown in FIG. 6.

Figure 4:
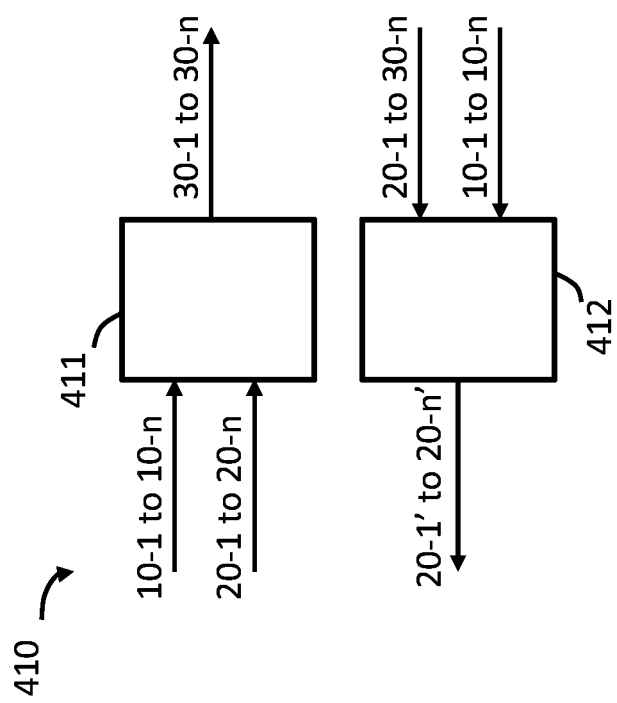
FIG. 4 is a block diagram of a media file encoder/decoder of the device according to an embodiment of the present disclosure.

FIG. 4 is a block diagram of a media file encoder/decoder 410 of the device 40 according to an embodiment of the present disclosure.

In an embodiment, referring to FIG. 4, the media file encoder/decoder 410 may be implemented with a digital signal processing (DSP) chip including a division circuit 411 (e.g., a binary division circuit) for performing the dividing of each of the second data vectors 20-1 to 20-n by a corresponding one of the first data vectors 10-1 to 10-n and a multiplication circuit 412 (e.g., a binary multiplication circuit) for performing the multiplying of each of the intermediate data vectors 30-1 to 30-n by a corresponding one of the first data vectors 10-1 to 10-n. Each of the division circuit 411 and the multiplication circuit 412 may be an integer circuit.

Although detailed configurations of the division circuit 411 and the multiplication circuit 412 are not described in the present disclosure, configurations of the division and multiplication circuits 411 and 412 for performing the above-described functions thereof are well known to a person skilled in the art.

In an embodiment, the media file encoder/decoder 410 may be implemented with a processor such as a central processing unit (CPU), a microprocessor, or the like. The CPU may include an arithmetic logic unit (ALU) to perform the above division and multiplication operations among the first media file 10, the second media file 20, and/or the first or second intermediate media file 30 or 30'.

The control device 430 may control the above operations of the media file encoder/decoder 410, the storage 420, the input interface 440, and the output interface 450.

Figure 5A:
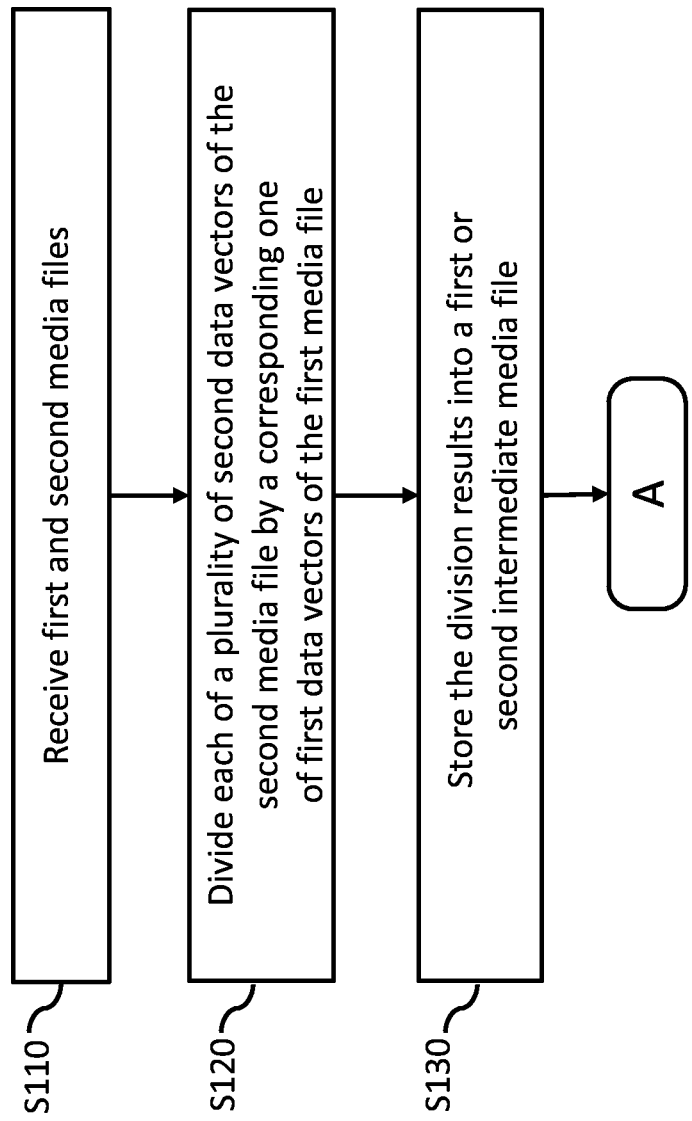
FIG. 5A is a flow chart illustrating a method of updating a media file for an increased resolution according to an embodiment of the present disclosure.
Figure 5B:
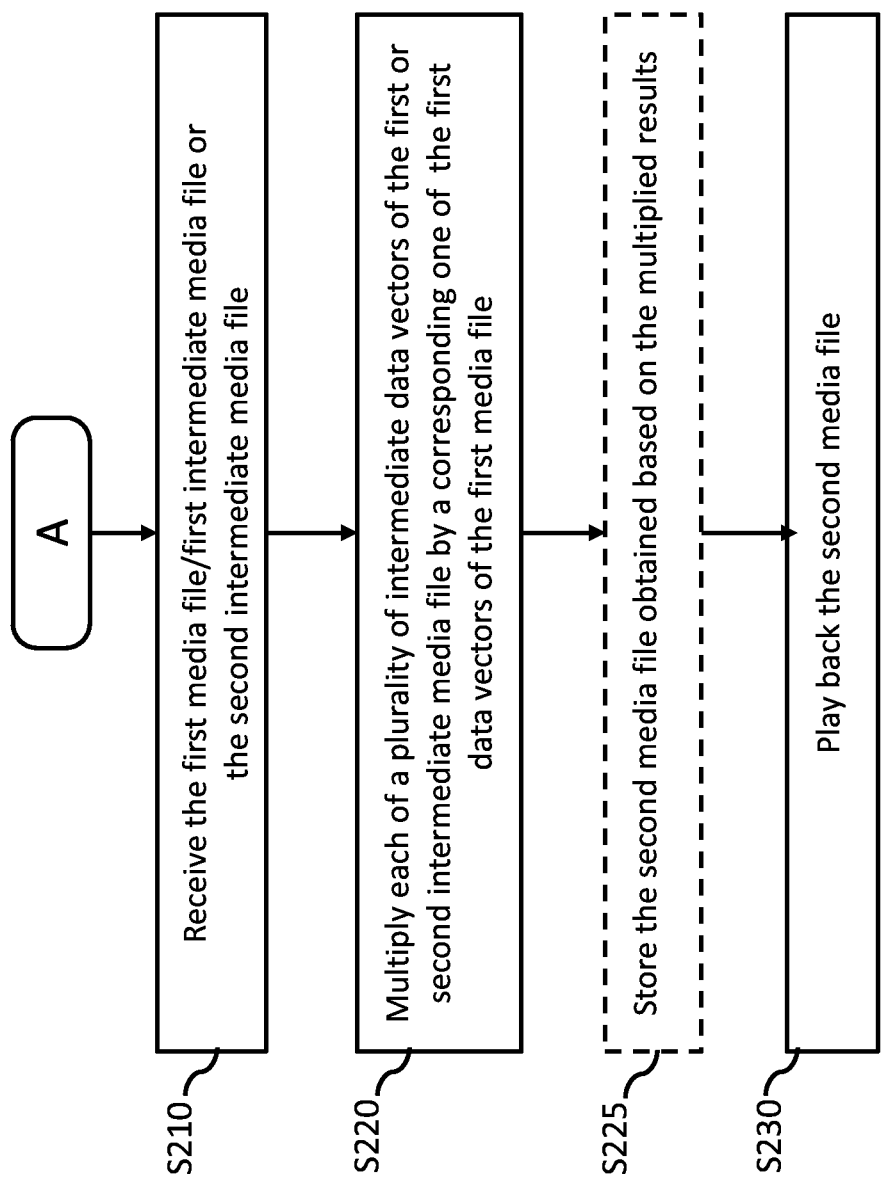
FIG. 5B is a flow chart illustrating a method of retrieving the media file updated through the method of FIG. 5A according to an embodiment of the present disclosure.

FIG. 5A is a flow chart illustrating a method of updating a media file for an increased resolution according to an embodiment of the present disclosure. FIG. 5B is a flow chart illustrating a method of retrieving the media file updated through the method of FIG. 5A according to an embodiment of the present disclosure.

Referring to FIG. 5A, the method of updating a media file for an increased resolution according to an embodiment of the present disclosure may include receiving first and second media files 10 and 20 in an operation S110. The first media file 10 includes a plurality of first data vectors 10-1 to 10-n and the second media file 20 includes a plurality of second data vectors 20-1 to 20-n. The method may further include dividing each of the second data vectors 20-1 to 20-n of the second media file 20 by a corresponding one of the first data vectors 10-1 to 10-n of the first media file 10 in an operation S120 and storing the division results into the first or second intermediate file 30 or 30' of the storage 420 in an operation S130. Thus, the first intermediate media file 30 may include a plurality of intermediate data vectors 30-1 to 30-n, and the second intermediate media file 30' may include both the intermediate data vectors 30-1 to 30-n and the first data vectors 10-1 to 10-n.

Referring to FIG. 5B, the method of retrieving the media file updated through the method of FIG. 5A according to an embodiment of the present disclosure may include reading the first and first intermediate media files 10 and 30 or the second intermediate media file 30' to obtain the first data vectors 10-1 to 10-n and the intermediate data vectors 30-1 to 30-n in an operation S210. The method may further include multiplying each of the plurality of intermediate data vectors 30-1 to 30-n by a corresponding one of the first data vectors 10-1 to 10-n to retrieve the original second media file 20' in an operation S220. The method may further include playing back the retrieved second media file 20' in an operation S230. In an embodiment, the method might not play back the retrieved second media file 20' immediately after the operation S220. For example, the method may include storing the retrieved second media file 20' to a storage (e.g., the storage 420) or memory (not shown) in an operation S225 prior to the operation S230, and thus, the device 40 could decide dynamically the playback of the retrieved second media file 20' based on available resources (e.g., CPU, memory, etc) on the device 420.

For example, depending on the state of the device 40 at the time of the multiplication in the operation S220 is completed, the second media file 20' may be stored in the storage or the memory without being played back, or may be stored in the storage or the memory and then played back later, or in an embodiment, the second media file 20' might not be stored in the storage or the memory, but fed to the media player 60 and played back in a streaming manner through the media player 60. For example, the second media file 20' may temporally be stored in a buffer (not shown) while being played back in the streaming manner. However, the present disclosure is not limited thereto.

The device 40 or the methods according to according to an embodiment of the present disclosure allow media (e.g., a media file of a storage device (e.g., 420 of FIG. 1 or a card) to be upgraded, storing different versions (e.g., 16 bits/sample and 24 bits/sample) of the media into the storage device with optimized, less usage of storage thereon by adding only an intermediate version (e.g., 30) of the media to the storage device without deleting or altering the low resolution version (e.g., 16 bits/sample) of the media.

In addition, the device 40 or the methods according to according to an embodiment of the present disclosure may supporting combining the low resolution version and the intermediate version of media file to store the combined result into the same file of the storage device, or may support storing the low resolution version and the intermediate version of the media into separate files, which may be different from each other in storage organization or file formats, so that flexibility for access to the media may be maximized. For example, using a digital right management (DRM) technique, it is possible to allow some users to access the low resolution version of the media, or allow other users to access the high resolution version (e.g., 24 bits/sample version) of the media, or both of the low and high quality versions of the media. For example, a DRM mechanism could be applied to allow anyone to access the low resolution version of the media on the storage device while only a DRM identified owner can access the high resolution version of the media on the storage device.

In addition, the device 40 or the methods according to according to an embodiment of the present disclosure may allow media purchasers to upgrade their low resolution version of the media for higher resolution version for each new increment in encoding resolution that is made available. Depending on whether the intermediate version of the media is stored in a separate file or a same file from/as the low resolution version of the media, the media purchaser could share the low resolution media file with another users using a simple copy operation, while the original media purchaser may have access to the high resolution media file.

Thus, when media distributors (not shown) may store the low resolution version and the intermediate version of the media into separate files and sell the higher resolution media file (e.g., 20) to users, the media distributors may control access right of the users to the higher resolution media file using the DRM technology.

Further, according to an exemplary embodiment of the present disclosure, the low resolution media file is unchanged during the upgrade process, and thus this storage algorithm may lend itself well to usage on Write Once, Read Many (WORM) devices. For example, the WORM devices may include spinning media and memory card versions.

FIG. 6 is a diagram illustrating a media distributing system including a media distributing server 50 and a user device 60 according to an embodiment of the present disclosure.

In an embodiment, referring to FIG. 6, the media distributing server 50 may store the first and second media files 10 and 20 in a storage 510 and distribute (or transmit) the first and second media files 10 and 20 to the user device 60 through a network 500. The media distributing server 50 may include the storage 510 and a network modem 520, and the user device 40 corresponding to the device 40 of FIG. 1 may include the media file encoder/decoder 410, the storage 420, the controller 430, the input interface 440, and the output interface 450, as described with reference to FIG. 1.

Referring back to FIG. 1, the user device 40 may generate the first intermediate media file 30 or the second intermediate media file 30' using the first and second media files 10 and 20 downloaded from the media distributing server 50 and store the first intermediate media file 30 or the second intermediate media file 30' into the storage 420. In an embodiment, the user device 40 may store the first media file 10 into the storage 420. Duplicate descriptions will be omitted for the purpose of simplicity.

Referring back to FIG. 1, later, upon user's request, the media file encoder/decoder 410 may decode the first intermediate media file 30 to generate the third media file 20' corresponding to the second media file 20 having a relatively high resolution. Further, the third media file 20' may be played back by a media player 60.

The network 500 may be implemented using on a wired communication based on Internet, local area network (LAN), wide area network (WAN), or a wireless communication based on code division multiple access (CDMA), global system for mobile communication (GSM), wideband CDMA, CDMA-2000, time division multiple access (TDMA), long term evolution (LTE), wireless LAN, Bluetooth, or the like.

Figure 7:
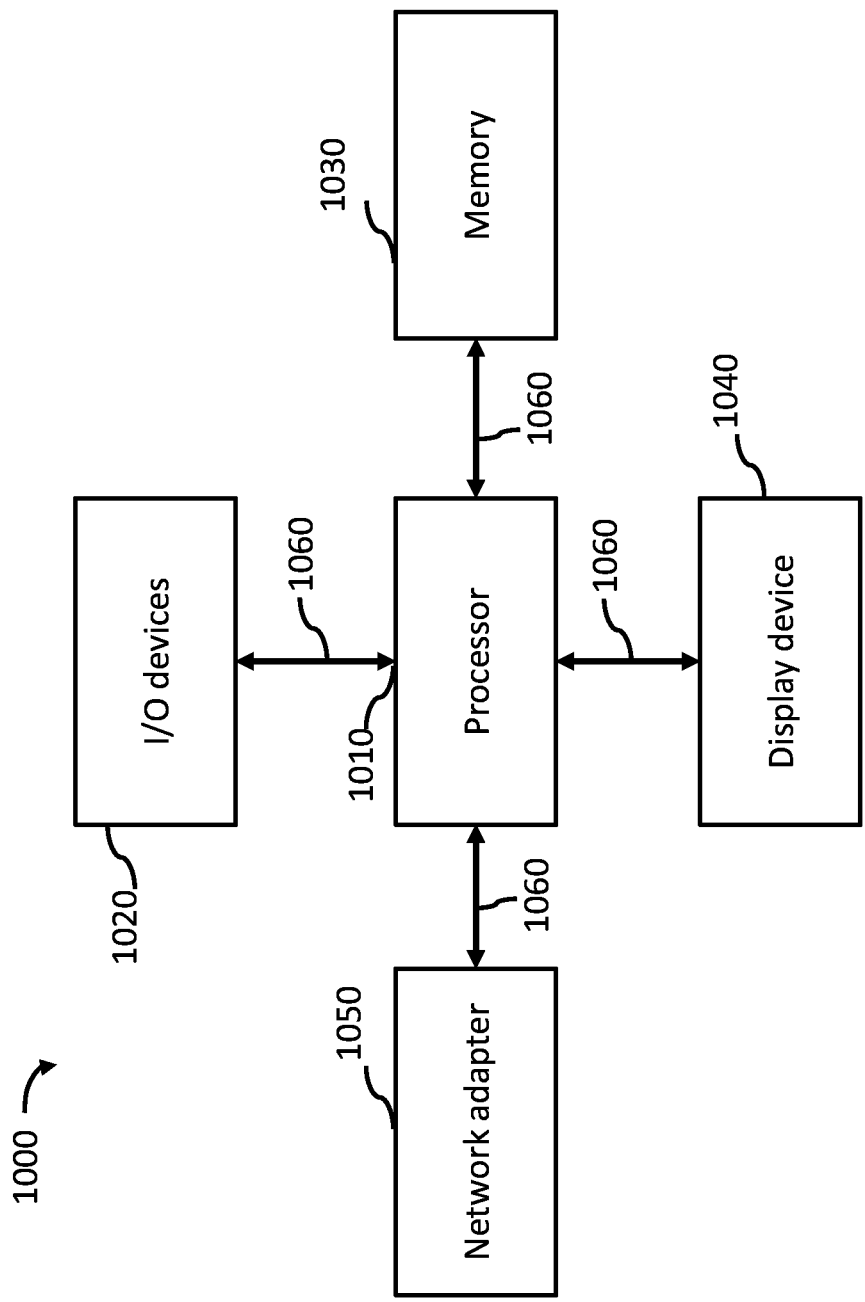
FIG. 7 is a block diagram of a computer system according to an embodiment of the present disclosure.

FIG. 7 is a block diagram of a computing system 1000 according to an embodiment of the present disclosure.

Referring to FIG. 7, the computing system 1000 may be used a platform for performing the functions or operations described hereinabove with respect to the device 40 of FIG. 1 or the methods of FIGS. 5A and 5B.

In addition, the computing system 1000 may be implemented with a ultra-mobile personal computer (UMPC), a net-book, a personal digital assistance (PDA), a portable computer (PC), a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like.

Referring to FIG. 7, the computing system 1000 may include a processor 1010, I/O devices 1020, a memory system 1030, a display device 1040, and a network adaptor 1050.

The processor 1010 may drive the I/O devices 1020, the memory system 1030, the display device 1040, and the network adaptor 1050 through a bus 1060.

The computing system 1000 may include a program module for performing the functions or operations described hereinabove with respect to the device 40 of FIG. 1 or the methods of FIGS. 5A and 5B according to exemplary embodiments. For example, the program module may include routines, programs, objects, components, logic, data structures, or the like, for performing particular tasks or implement particular abstract data types. The processor (e.g., 1010) of the computing system 1000 may execute instructions written in the program module to perform the functions or operations described with respect to the device 40 of FIG. 1 or the methods of FIGS. 5A and 5B. The program module may be programmed into the integrated circuits of the processor (e.g., 1010). In an exemplary embodiment, the program module may be stored in the memory system (e.g., 1030) or in a remote computer system storage media.

The computing system 1000 may include a variety of computing system readable media. Such media may be any available media that is accessible by the computer system (e.g., 1000), and it may include both volatile and non-volatile media, removable and non-removable media.

The memory system (e.g., 1030) can include computer system readable media in the form of volatile memory, such as random access memory (RAM) and/or cache memory or others. The computer system (e.g., 1000) may further include other removable/non-removable, volatile/non-volatile computer system storage media.

The computer system (e.g., 1000) can communicate with one or more devices using the network adapter (e.g., 1050). The network adapter may support wired communications based on a LAN, a WAN, or the like, or wireless communications based on CDMA, GSM, wideband CDMA, CDMA-2000, TDMA, LTE, wireless LAN, Bluetooth, or the like.

Exemplary embodiments of the present disclosure may include a system, a method, and/or a computer program product. The computer program product may include a non-transitory computer readable storage medium (e.g., the memory system 1030) having computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 1000 from the computer readable storage medium or to an external computer or external storage device via a network (e.g., 500). The network may include copper transmission cables, optical transmission fibers, wireless transmission, routers, firewalls, switches, gateway computers and/or edge servers. A network adapter card (e.g., 1050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 1000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device, and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A device of reducing storage usage for media files, comprising:
   an I/O interface receiving a first media file having a plurality of first data samples and a second media file having a plurality of second data samples and transmitting the first and second media files to a processor, each of the first data samples is sampled from an analog media signal and encoded with P bits and each of the second data samples is sampled from the analog media signal and encoded with Q bits, wherein "P" and "Q" are integers, and a resolution in bits of Q is greater than a resolution in bits of P;
   the processor dividing each of the second data samples by a corresponding one of the first data samples to calculate a plurality of third data samples, each of which corresponds to each of the second data samples; and
   a storage device storing the calculated third data samples into a third media file.

2. The device of claim 1, wherein the processor further multiplies each of the third data samples by the corresponding one of the first data samples to calculate a plurality of fourth data samples, the fourth data samples constituting a fourth media file, and
   wherein each of the calculated fourth data samples corresponds to each of the second data samples.

3. The device of claim 2, wherein the first and fourth media files are played back by a media player.

4. The device of claim 2, wherein the processor comprises:
   a first integer circuit performing the dividing of each of the second data samples by the corresponding one of the first data samples; and
   a second integer circuit performing the multiplying of each of the third data samples by the corresponding one of the first data samples.

5. The device of claim 1, wherein P is 16 and Q is 24.

6. The device of claim 1, wherein a size of the third media file is smaller than a size of the second media file.

7. The device of claim 1, wherein the storage device stores the third data samples in a different file from the first data samples.

8. The device of claim 7, wherein the third media file is sold to a media purchaser and an access right to the third media file is controlled using a digital right management (DRM) technology.

9. The device of claim 7, wherein the first media file and the third media file are accessed according to different access rights from each other.

10. The device of claim 9, wherein the third media file is accessed with a higher level of access right than that of the first media file.

11. A method of reducing storage usage for media files, comprising:
    receiving, at a processing unit, a first media file having a plurality of first data samples and a second media file having a plurality of second data samples, each of the first data samples is sampled from an analog media signal and encoded with P bits and each of the second data samples is sampled from the analog media signal and encoded with Q bits, wherein "P" and "Q" are integers, and a resolution in bits of Q is greater than a resolution in bits of P,
    dividing, at the processing unit, each of the second data samples by a corresponding one of the first data samples to obtain a plurality of third data samples, each of which corresponds to each of the second data samples; and
    storing, in a storage device, the plurality of third data samples into a third media file.

12. The method of claim 11, further comprising:
    multiplying each of the third data samples by the corresponding one of the first data samples to calculate a plurality of fourth data samples, the fourth data samples constituting a fourth media file, and
    wherein each of the calculated fourth data samples corresponds to each of the second data samples.

13. The method of claim 11, wherein P is 16 and Q is 24.

14. The method of claim 13, wherein the first media file and the third media file are accessed according to different access rights from each other.

15. The method of claim 14, wherein the access right is controlled using a digital right management (DRM) technology.

16. A computer program product stored in a non-transitory computer-readable storage medium having computer readable program instructions, the computer readable program instructions read and carried out by a processor for performing reducing storage usage for media files,
    wherein the method comprises:
    receiving a first media file having a plurality of first data samples and a second media file having a plurality of second data samples, each of the first data samples is sampled from an analog media signal and encoded with P bits and each of the second data samples is sampled from the analog media signal and encoded with Q bits, wherein "P" and "Q" are integers, and a resolution in bits of Q is greater than a resolution in bits of P,
    dividing each of the second data samples by a corresponding one of the first data samples to obtain a plurality of third data samples, each of which corresponds to each of the second data samples; and
    storing the plurality of third data samples into a third media of a storage device.

17. The computer program product of claim 16, the method further comprising:
    multiplying each of the third data samples by the corresponding one of the first data samples to calculate a plurality of fourth data samples, the fourth data samples constituting a fourth media file, and
    wherein each of the calculated fourth data samples corresponds to each of the second data samples.

18. The computer program product 16, wherein P is 16 and Q is 24.

19. The computer program product claim 16, wherein the first media file and the third media file are accessed according to different access rights from each other.

20. The computer program product of claim 19, wherein the access right is controlled using a digital right management (DRM) technology.

* * * * *